United States Patent [19]

Pfeifer

[11] Patent Number: 4,561,115

[45] Date of Patent: Dec. 24, 1985

[54] DECODER FOR TRAFFIC INFORMATION REGIONAL TONE SIGNALS

[75] Inventor: Heinrich Pfeifer, Denzlingen, Fed. Rep. of Germany

[73] Assignee: ITT Industries, Inc., New York, N.Y.

[21] Appl. No.: 587,559

[22] Filed: Mar. 8, 1984

[51] Int. Cl.[4] .............................................. H04B 1/16

[52] U.S. Cl. ...................................... 455/228; 455/45; 455/226; 340/905; 340/825.48

[58] Field of Search ................... 455/38, 227, 228, 45, 455/35, 36, 226; 340/905, 825.44, 825.48

[56] References Cited

U.S. PATENT DOCUMENTS 4,435,843 3/1984 Eilers et al. ......................... 455/228

4,450,589 5/1984 Eilers et al. ......................... 455/228

FOREIGN PATENT DOCUMENTS 65025 4/1982 Japan .................................. 455/228

*Primary Examiner*—Jin F. Ng

*Attorney, Agent, or Firm*—Donald J. Lenkszus

[57] ABSTRACT

A circuit for decoding broadcast traffic area signals according to the European standards utilizes digital circuitry to check for four criteria.

12 Claims, 3 Drawing Figures

DECODER FOR TRAFFIC INFORMATION REGIONAL TONE SIGNALS

BACKGROUND OF THE INVENTION

The present invention relates to an arrangement for decoding traffic information regional tone signals. The regional tone signals are contained in the form of a carrier which is amplitude-modulated therewith in a received broadcast signal which has already been demodulated in a conventional radio receiver.

In the journal "Funkschau", 1974, pages 535 to 538, the system currently used in Germany and other European countries for broadcasting traffic information to radio listeners is described. In this system, a territory is divided into several traffic information regions by adding regional tone signals to the traffic information signal. These regional tone signals, whose frequency, i.e., the regional tone frequency, is the information on the region, are low-frequency signals which are impressed on the carrier, having a frequency of 57 kHz in the known system, by amplitude modulation. They are derived from the carrier by integral frequency division.

This traffic information broadcasting system is described in detail in the journal "Rundfunktechnische Mitteilungen" 1974, pp. 193 to 202. According to this reference, system parameters were so chosen that the decoder circuits required for automatic traffic information reception were compatible with conventional analog-signal-processing receiver circuits and did not interfere therewith. The hitherto used decoder circuits are, therefor, analog circuits as well.

SUMMARY OF THE INVENTION

In accordance with the invention, an integrated circuit is provided for decoding traffic information regional tone signals which works on the principles of digital technology and, thus, consists largely of digital subcircuits. The response time of the circuit is shorter than one second, e.g., 300 ms, and the recognition of the respective region is to be immune to noise.

In accordance with the invention, the broadcast signal demodulated in the usual manner, is first converted to a very low intermediate frequency and then changed from analog to digital form.

To permit reliable recognition of the regional tone signal, four quality conditions are monitored. Only if these four conditions are present together, will the decoded signal be released. These four conditions are: channel spacing, sum-channel spacing, depth of modulation, and presettable time threshold. The response time of the circuit is reduced without decreasing the safety of decoding. In addition, the circuit is practically immune to noise and interference. Components used to monitor the four conditions include comparators and AND gates.

BRIEF DESCRIPTION OF THE DRAWINGS

The invention and its advantages will now be explained in more detail with reference to the accompanying drawings, in which.

DETAILED DESCRIPTION

Figure 1:
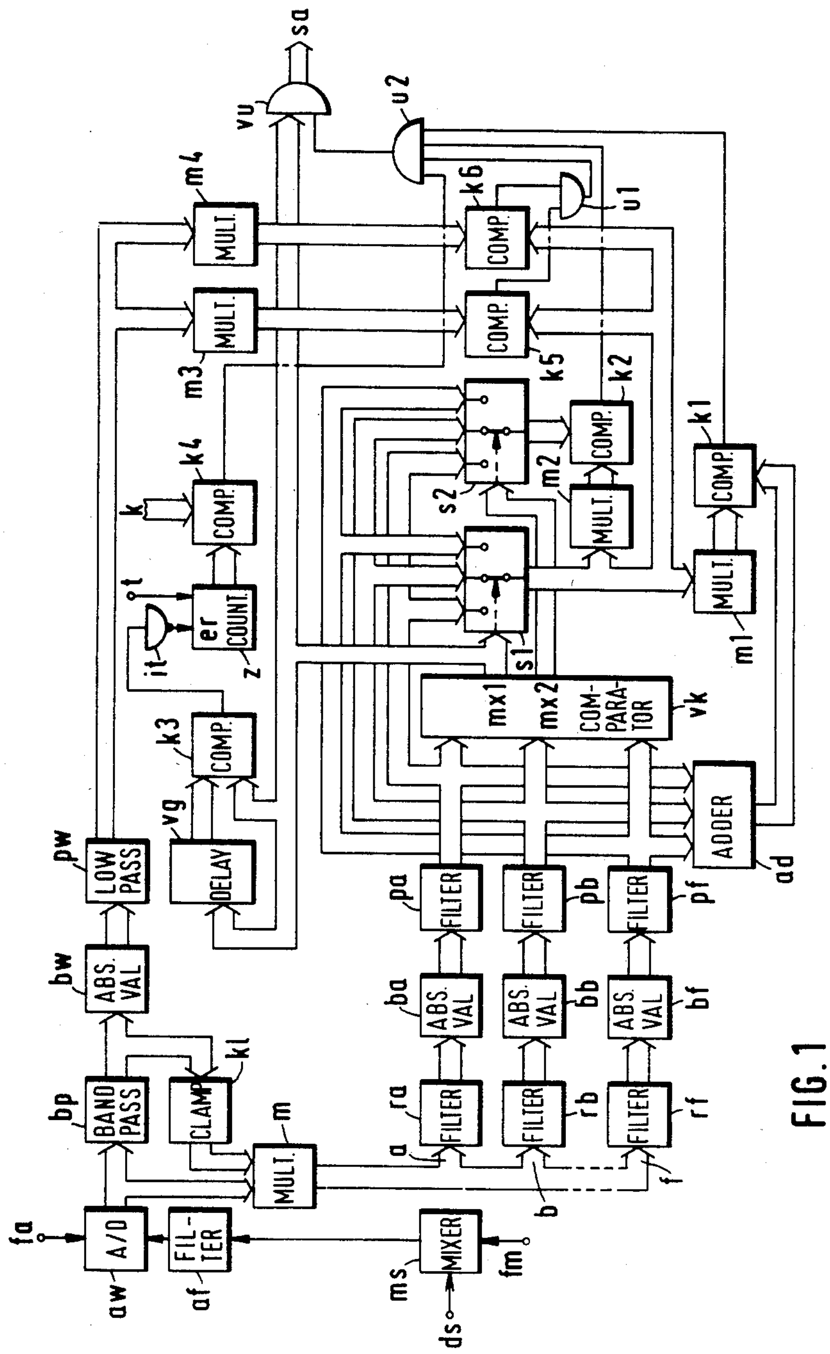
FIG. 1 is a block diagram of an embodiment of the invention.

The block diagram of FIG. 1 shows an embodiment of an integrated circuit for decoding traffic information regional tone signals in accordance with the invention.

The demodulated broadcast signal ds, obtained by means of a conventional radio receiver, is fed to the mixer ms, whose local-oscillator frequency fm is higher than the highest regional tone frequency fb. In the system described in the two journals cited above, the local-oscillator frequency fm is thus higher than the regional tone frequency assigned to the region F, 53.98 Hz. In an implemented circuit, the local-oscillator frequency fm=223.5 Hz. The mixer ms converts the frequency of regional tone signals modulated on the carrier to the local-oscillator frequency fm.

The output of the mixer ms is coupled to the input of the analog-to-digital converter aw through the analog low-pass filter af. The upper cutoff frequency of the low-pass filter af is equal to half the sampling frequency of the analog-to-digital converter aw at the most. The output of the analog-to-digital converter aw is connected to the input of the digital band-pass filter bp, whose mid-frequency fc is equal to the difference between the carrier frequency ft and the local-oscillator frequency fm, i.e., fc=ft−fm.

The output of the analog-to-digital converter aw is also coupled to the first input of the multiplier m, which has its second input connected to the output of the digital clamping circuit k1 following the digital-band-pass filter bp. This digital clamping circuit clamps positive and negative input signals to positive and negative maximum values, respectively, which are determined by the numbers of digits of these signals.

Figure 2:
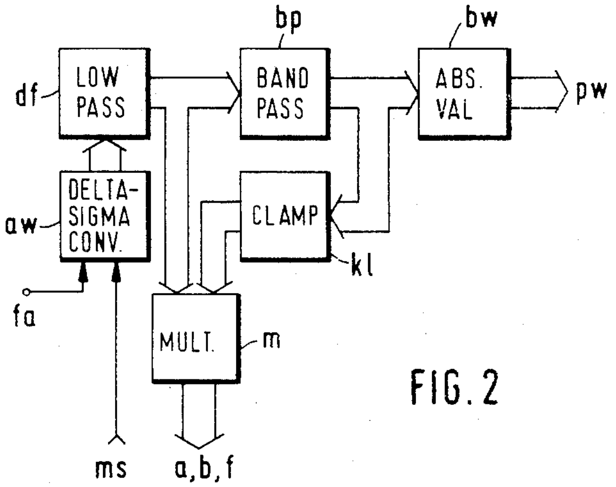
FIG. 2 shows a slightly modified input portion of the arrangement of FIG. 1.

At this point, it should be mentioned that the analog-to-digital converter aw may follow the mixer ms directly, as in the modified input portion shown in FIG. 2. The analog-to-digital converter aw must then be a delta-sigma converter, and the digital low-pass filter df must be inserted between the input of the digital band-pass filter bp and the output of the analog-to-digital converter aw.

By means of the digital band-pass filter, the local-oscillator signal is recovered, which is normalized in amplitude by means of the digital clamping circuit k1. The regional tone signals are then demodulated by means of the multiplier m.

Connected to the output of the multiplier m are a number of signal paths, one path for each regional tone frequency; of these signal paths, the paths a, b, f are shown in FIG. 1. Each signal path consists of the digital resonance filter ra, rb, rf for the respective regional tone frequency fb, which is followed by the digital absolute-value former ba, bb, bf and the digital low-pass filter pa, pb, pf, whose upper cutoff frequency is lower than twice the lowest regional tone frequency. In the prior art system described at the beginning, this lowest regional tone frequency, assigned there to the region A, has a value of 23.75 Hz. The function of the three subcircuits in each of the three signal paths a, b, f is to perform a selective level measurement.

One output of each of the low-pass filters pa, pb, pf is connected to one of the inputs of the multiple comparator vk, whose first maximum output mx1 provides a signal indicating the signal path which carries the largest signal, i.e., a digital word for the number of the signal path which the largest signal value appears at the first maximum output mx1. Similarly, the second maximum output mx2 provides a signal specifying the number of the signal path which carries the second largest signal.

The first and second maximum outputs mx1 and mx2 are connected to the control inputs of the first and second electronic multiple switches s1 and s2, respectively, each of which has one of its inputs connected to one of the outputs of the low-pass filters pa, pb, and pf, respectively. The two multiple switches s1, s2 thus have as many inputs as there are signal paths, and in response to the signals at the maximum outputs mx1 and mx2, they are connected to the signal paths carrying the largest and the second largest signal value, respectively.

The output of the first multiple switch s1 is connected via the first constant multiplier m1 to the minuend input of the first comparator k1, which has its subtrahend input connected to the output of the multiple adder ad. The latter has its inputs connected to the outputs of the low-pass filters pa, pb, and pf, respectively. The output of the first multiple switch s1 is also connected via the second constant multiplier m2 to the minuend input of the second comparator k2, which has its subtrahend input connected to the output of the second multiple switch s2.

The second comparator k2 and the second constant multiplier m2 determine whether the amplitude of the first maximum signal multiplied by a constant factor is greater than the second maximum signal. By means of this constant used as the multiplier factor in the second constant multiplier m2, the channel spacing can thus be fixed.

In similar fashion, the level of the first maximum signal is compared with the sum of the signal values of the other signal paths by means of the first constant multiplier m1 and the first comparator k1. This is a signal-to-noise ratio measurement.

The first maximum output mx1 of the multiple comparator vk is connected to the delay element vg, whose output is coupled to the minuend input of the third comparator k3, which has its subtrahend input connected to the first maximum output mx1. The minuend-equal-to-subtrahend output of the third comparator k3 is coupled through the inverter it to the reset input er of the counter z, whose count input is presented with the clock signal t, and whose outputs are connected to the minuend input of the fourth comparator k4. The constant k, used as a threshold value, is applied to the subtrahend input of the fourth comparator k4. With the subcircuits just explained, i.e., vg k3, it, z, and k4, a signal is produced at the minuend-greater-than-subtrahend output of the fourth comparator k4 only if the first maximum signal was constant for the period determined by the frequency of the clock signal t and the constant k. A time threshold is thus realized with these subcircuits.

The output of the digital band-pass filter bp is coupled to the additional digital absolute-value former bw, which is followed by the additional digital low-pass filter pw, whose upper cutoff frequency is equal to that of the low-pass filters pa, pb, pf, and whose output is coupled through the third and fourth constant multipliers m3 and m4 to the subtrahend inputs of the fifth and sixth comparators k5 and k6, respectively, which have their minuend inputs connected to the output of the first multiple switch s1. The minuend-greater-than-subtrahend output of the fifth comparator k5 and the minuend-smaller-than-subtrahend output of the sixth comparator k6 are each connected to one of the two inputs of the first AND gate u1. With the last-mentioned subcircuits bw, pw, m3, m4, k5, k6, and u1, the depth of the modulation of the regional tone signals is monitored, for noise manifests itself as an increased depth of modulation, and, on the other hand, an unmodulated carrier frequency produces noise. To monitor the depth of modulation, the first maximum signal is compared with the amplitude of the local-oscillator signal with respect to an upper threshold and a lower threshold which are predetermined by the constants of the third and fourth constant multipliers m3 and m4, respectively.

The four inputs of the second AND gate u2 are connected to the minuend-greater-than-subtrahend outputs of the first comparator k1, the second comparator k2, and the fourth comparator k4 and to the output of the first AND gate u1, respectively. The first maximum output mx1 of the multiple comparator vk is coupled to the parallel input of the multiple AND gate vu, whose output is the regional-tone-signal output sa of the integrated circuit, and the output of the second AND gate u2 is connected to all terminals of the second parallel input of the multiple AND gate vu. The second AND gate u2 thus checks for the simultaneous presence of the four conditions to be monitored, and only if this requirement is satisfied, will the number of the associated region be transferred to the regional-tone-signal output sa.

The invention thus uses four quality conditions to reliably identify the regional tone signal. Only if these four conditions are present at the same time, will the decoded signal be released. These four conditions are: channel spacing, sum-channel spacing, depth of modulation, and presettable time threshold. Although the monitoring of these four conditions requires a certain amount of circuitry, the response time of the overall circuit is reduced without decreasing the safety of decoding, and this is one of the advantages of the invention. In addition, the circuit is practically immune to noise and interference.

Figure 3:
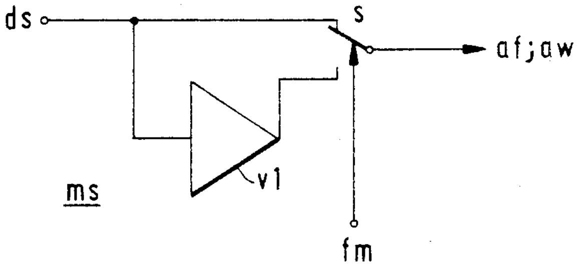
FIG. 3 shows a mixer as can be used to advantage in the invention.

FIG. 3 shows a preferred embodiment of the mixer ms, which consists of the unity-gain amplifier vl and the electronic switch s, whose control signal is the local-oscillator signal fm. The unity-gain amplifier v1, like a conventional analog amplifier, provides a signal shifted in phase with respect to its input signal by 180°. In one position of the switch s, the broadcast signal ds, which is also applied to the input of the unity-gain amplifier v1, is transferred directly to the output of the switch s; in the other position, it is transferred to this output with a 180° phase shift, i.e., in inverted form. In this embodiment, the local-oscillator signal fm is a square-wave signal.

What is claimed is:

1. A circuit for use in a radio receiver for decoding traffic information regional tone signals amplitude modulated with a broadcast signal carrier which has been demodulated, said circuit comprising:

a mixer receiving the demodulated broadcast signal and coupled to a local oscillator having a frequency higher than the frequency of the highest one of said regional tone signals;

an analog-to-digital converter coupled to the output of said mixer;

a digital band-pass filter coupled to the output of said analog-to-digital converter and having a mid frequency equal to the difference between that of said carrier and that of said local oscillator;

a digital clamping circuit having an input coupled to the output of said digital band-pass filter, serving to clamp positive and negative valued signals to positive and negative maximum values which are respectively determined by the number of digits of said input signals;

a multiplier having a first-input coupled to the output of said analog-to-digital converter, a second input coupled to the output of said digital clamping circuit;

a plurality of signal paths each having an input coupled to the output of said multiplier, each of said signal paths being associated with one of said regional tone signals and each comprising a digital resonance filter, followed by a digital absolute value former and a digital low pass filter having an upper cutoff frequency less than twice the lowest frequency of said regional tone signals;

a multiple comparator having a plurality of inputs and first and second maximum outputs;

each said low pass filter having first output coupled to one of said multiple comparator inputs;

first and second electronic multiple switches each having control inputs respectively connected to said multiple comparator first and second maximum outputs, each having a plurality of inputs, each said digital low pass filter having an output coupled to one of said plurality of inputs of said first multiple switch and to one of said plurality of inputs of said second multiple switch, and each having an output, said first electronic multiple switch being responsive to said first maximum output such that the one of said plurality of inputs having a first maximum value is coupled to said first electronic multiple switch output;

said second electronic multiple switch being responsive to said second maximum value output such that the one of said plurality of inputs having a second maximum value is coupled to said second electronic multiple switch output;

a multiple adder having a plurality of inputs each coupled to the output of one of said digital low pass filters and an output;

a first comparator having a first input coupled to said multiple adder output, a second input and an output;

a first constant multiplier coupling said first electronic multiple switch output to said first comparator second input;

a second comparator having a first input coupled to said second electronic multiple switch output, a second input, and an output;

a second constant multiplier coupling said first electronic multiple switch output to said second comparator second input;

a third comparator having a first input coupled to said first maximum output, a second input and an output;

a delay element coupling said first maximum output to said third comparator second input;

a counter having a count input for receiving clock signals, count outputs and a reset input;

circuit means coupling said third comparator output to said reset input;

a fourth comparator having a first input coupled to said counter outputs, a second input receiving a constant serving as a threshold value, and an output;

a digital absolute-value former coupled to the output of said digital band pass filter;

a second digital low pass filter coupled to the output of said absolute value former, having a predetermined upper cutoff frequency;

third and fourth constant multipliers each coupled to said second digital low pass filter and each having an output;

a fifth comparator having a first input coupled to said third constant multiplier output, a second input coupled to said first multiple switch output and having an output;

a sixth comparator having a first input coupled to said fourth constant multiplier output, a second input coupled to said first multiple switch output and having an output;

first logic means coupled to said first second, fourth, fifth and sixth comparators for generating gating signals; and second logic means having inputs coupled to said first maximum output, a gate input receiving said gating signals, and an output, said second logic means coupling said first maximum output to said second logic means output in response to said gating signals to provide a regional tone signal output.

2. A circuit in accordance with claim 1 wherein said circuit is formed as an integrated circuit.

3. A circuit in accordance with claim 2 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

4. A circuit in accordance with claim 1 comprising an analog low pass filter coupled between said mixer and said analog-to-digital converter and having said predetermined cutoff frequency.

5. A circuit in accordance with claim 4 wherein said predetermined cutoff frequency is no higher than half the sampling frequency of said analog-to-digital converter.

6. A circuit in accordance with claim 5 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

7. A circuit in accordance with claim 4 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

8. A circuit in accordance with claim 1 wherein said analog-to-digital converter is a signma-delta converter.

9. A circuit in accordance with claim 5 comprising a digital low pass filter coupled between said analog-to-digital converter and said digital band-pass filter.

10. A circuit in accordance with claim 9 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

11. A circuit in accordance with claim 8 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

12. A circuit in accordance with claim 1 wherein said mixer comprises:

an electronic switch having two inputs, a control input and an output; and an inverting unitary gain amplifier, said amplifier having its output coupled to one of said two inputs, the other of said two inputs and the input of said amplifier receiving said demodulated broadcast signal;

said electronic switch control input being coupleable to said local oscillator and adapted to receive a square wave signal therefrom.

* * * * *